United States Patent [19]

Turner, Jr. et al.

[11] Patent Number: 4,733,808

[45] Date of Patent: Mar. 29, 1988

[54] HUNTING CALL HOLDER

[76] Inventors: Dan B. Turner, Jr., 1103 Cary Ave.; Richard Doucet, Jr., P.O. Box 801 (2nd St.), both of Jennings, La. 70546

[21] Appl. No.: 900,761

[22] Filed: Aug. 27, 1986

[51] Int. Cl.⁴ .............................................. A45F 3/14
[52] U.S. Cl. .................................... 224/219; 224/267
[58] Field of Search ............... 224/218, 219, 222, 267, 224/919, 220, 221; 446/26, 202, 207, 204

[56] References Cited

U.S. PATENT DOCUMENTS

| 303,139 | 8/1884 | Farnham | 446/204 |
| 1,258,077 | 3/1918 | Worcester | 446/26 |
| 1,482,647 | 2/1924 | Gise | 224/219 |
| 1,568,528 | 1/1926 | Petrie | 446/26 |
| 2,961,135 | 11/1960 | Hughes, Jr. | 224/219 |
| 4,061,256 | 12/1977 | Beer et al. | 224/219 |
| 4,069,954 | 1/1978 | Rauch | 224/219 |
| 4,315,641 | 2/1982 | Larsen | 224/219 X |
| 4,341,331 | 7/1982 | McDougall | 224/219 |
| 4,489,867 | 12/1984 | Schwemberger | 224/219 |

FOREIGN PATENT DOCUMENTS 875517  9/1942  France .

Primary Examiner—Henry J. Recla
Assistant Examiner—David Voorhees
Attorney, Agent, or Firm—A. Robert Theibault

[57] ABSTRACT

The present disclosure is directed to a fowl call holder attachable about the wrist of a hunter wherein a flexible strap has a major portion and a minor portion. An elastic expandable strip is stitched at each end to said major and minor portion of the flexible strap, and an elastic all encircling strap loop resiliently snugly engages about the fowl call to retain it on the strap. Complemental Velcro adhesive surfaces on the major and minor portions of the flexible strap secure the strap about the wrist of the hunter with only minor expansion of the strap permitted by said elastic expandable strip between said major and minor portion.

3 Claims, 5 Drawing Figures

HUNTING CALL HOLDER

TECHNICAL FIELD

The present disclosure is directed to a structure for attaching a fowl call to the wrist of a hunter enabling him to sit in a blind while maintaining both hands on his shotgun with his face down so that the sun will not reflect off his face and alarm and divert the flight path of incoming birds. The hunter may actuate the call without looking up or detracting from his gun ready position while he talks the birds in.

BACKGROUND OF THE INVENTION

Heretofore fowl call holders have been known such as the Hughes U.S. Pat. No. 2,961,135 and wrist mounted whistles as shown in French patent No. 875,517 as well as U.S. Pat. Nos. 303,139, 1,258,077, 1,568,528, and VELCRO wrist straps such as shown in U.S. Pat. Nos. 4,069,954, 4,341,331, and 4,489,867 have been known for attaching various items to the wrist of a human for various purposes all of which vary structurally from the present invention as well as varying from the use of the present invention.

SUMMARY OF THE INVENTION

The present invention is directed to positioning a fowl call on the wrist of a hunter which will enable him to maintain both hands on the shotgun with his head down for actuating for example a duck call without looking up and having the sun reflect off his face and warning the birds off.

Another object of the present invention is the provision of a duck call holder which may be applied about the hunter's wrist over cold weather or foul weather clothing whether it is bulky or thin.

A further object of the invention is to provide a duck call holder which can be worn/strapped on either wrist, preferably the non-trigger hand, over the wrist area of hunting gloves, shirt, jacket, etc. so as to have the call, particularly the feed call, readily available for sounding when the ducks or geese are in a position of flight whereby the hunter should be demonstrating no movement, but yet wants to maintain calling ability and visual contact. Furthermore, particularly when sitting in a blind, the advantage of wearing the duck call of the present invention is that it permits the hunter to keep both hands on the appropriate areas of his shotgun, while calling, thus maintaining the ultimate ready-to-come-up and shoot position. The call holder of the present invention prevents calls from clacking together on a lanyard when the hunter lets go of the call to grasp his shotgun.

This call holder will prevent the possibility of ducks, geese, etc. flying away because the hunter had to look down at his lanyard at his chest area to find the right call and then look back up to establish visual contact. Overall, the present wrist call holder helps keep facial movement to a minimum. Additionally, when the hunter's arm is hanging down by his side the call with a wrist call holder will neatly tuck itself up into the sleeve of a raincoat and/or hunting coat. When sitting with the shotgun perpendicular to the ground, while using this call holder and holding the forearm or barrel of his shotgun in the ready to shoot position due to the location of head to hand/mouth to call, the bill of his hat/cap will keep rain, snow, etc. out of the call.

THE BEST MODE FOR CARRYING OUT THE INVENTION

Figures 1, 2:
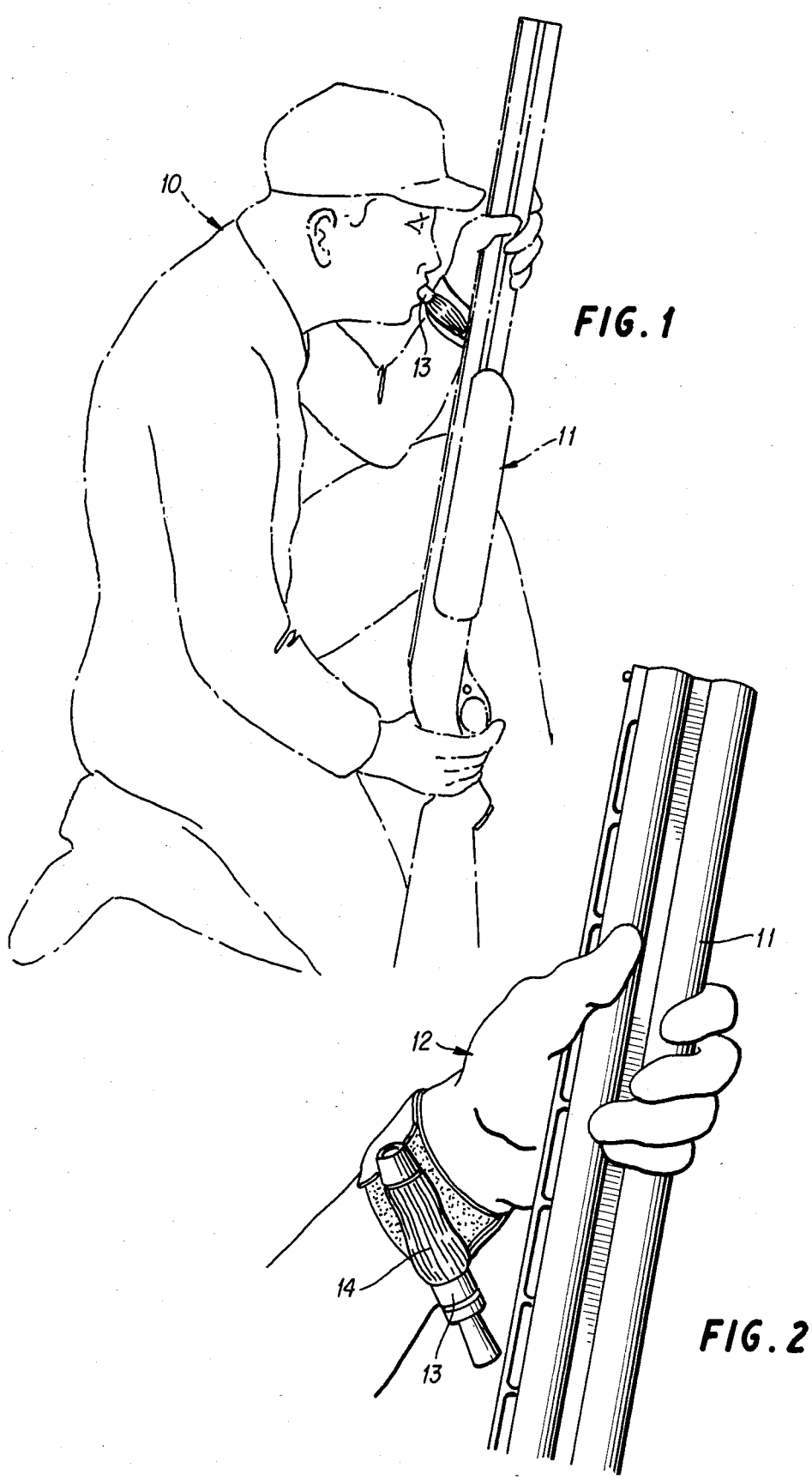
FIG. 1 is a schematic perspective view of a hunter kneeling in a blind holding his shotgun with both hands and having the fowl call holder of the present invention holding a call strapped to his non-trigger wrist.
FIG. 2 is a magnified schematic view of the hunter's non-trigger hand holding the shotgun showing the call holder with the call in place.

Referring now to FIGS. 1 and 2, 10 designates a hunter kneeling in a duck blind holding his shotgun 11 with both hands. Strapped to his left wrist or non-trigger hand 12 is a duck or goose call 13 which is held to his wrist by an elastic tube 14 best seen in FIG. 5 which is stitched to the major portion 15 of a flexible strap 16 having also a minor portion 17. The two strap portions 15, 17 have complemental cooperating hook pile fabrics constructed in accordance with U.S. Pat. Nos. 2,717,437 and 3,009,235 and marketed under the trademark VELCRO brand hook and pile fasteners by the Velcro Corporation of New York City, N.Y.

Figure 5:
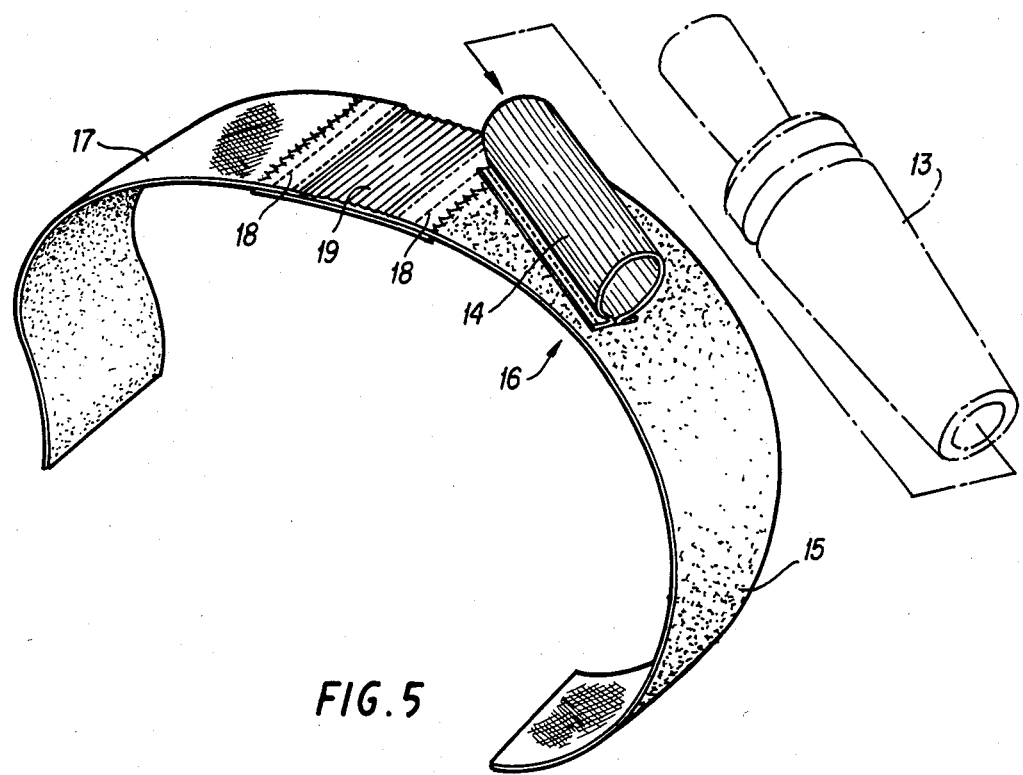
FIG. 5 is a perspective view of a single call holder with the call shown in chain line.
Figure 4:
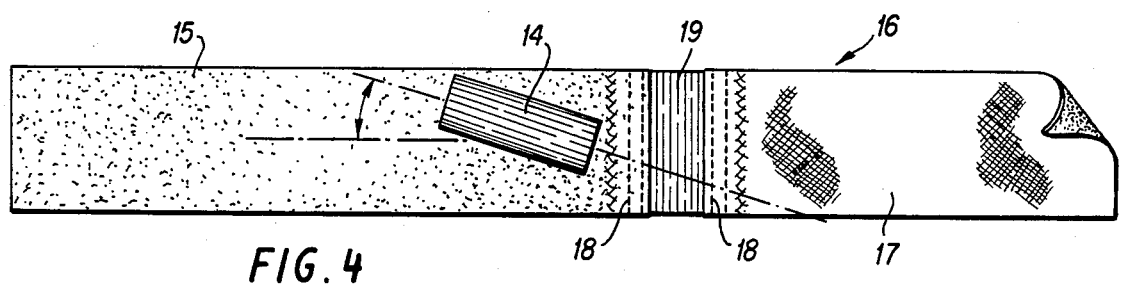
FIG. 4 is a plan view of a single call holder constructed in accordance with the present invention having the call removed.

Stitched between the strap major portion 15 and the minor portion 17 of strap 16 or 18 is an elastic band 19 which permits of a slight elongation of the strap 16. The elastic call tubular holder 14 is stitched to the major portion 15 of strap 16, as best seen in FIG. 5, so that the call 13 may be force fit into tube 14. The axis of the tube 14 is stitched to strap portion 15 at an angle to the strap 16 centerline as shown in FIG. 4 so that the mouth piece of the call 13 will be presented to the hunter as shown in FIGS. 1 and 2.

The call holders are packaged so that the wrist straps 16 will be long enough that one size fits all wrists. After buying and experimenting with wrist thickness of hunting attire, the hunter can cut the VELCRO straps on the major and minor portions of the flexible strap 16 for a personalized fit.

Figure 3:
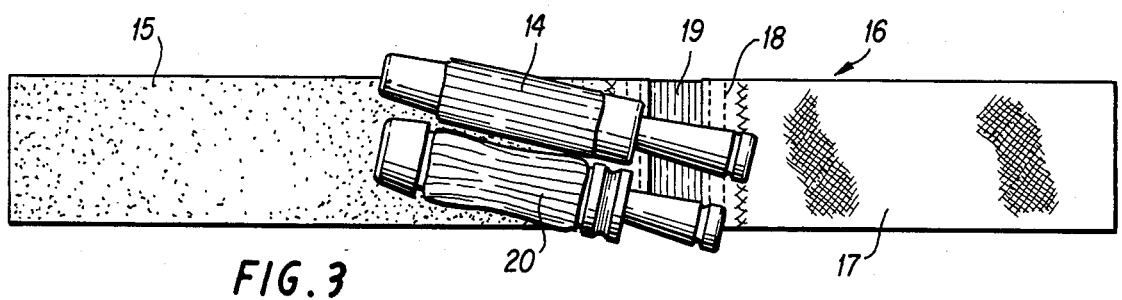
FIG. 3 is a plan view of the call holder strap of the present invention with two calls in place on the holder.

As shown in FIG. 3, two calls may be mounted on the strap 16 by providing two tubes 14 and 20, one for a feeding call and the other for a mating call.

What we claim is:

1. The combination of a fowl call having a major and minor axis mounted in a fowl call holder attachable about the wrist of a hunter comprising a flexible wrist strap having a major and minor portion, each having a major and minor axis, an elastic expandable strip stitched at each end to said flexible wrist strap, an elastic call encircling strap loop secured to the major portion of said wrist strap and resiliently and snugly engaging about said fowl call and being oriented on said wrist strap at an angle to the major axis of said flexible wrist strap with the major axis of said call encircling strap loop positioned to thereby place the mouth piece of the call accessible to the mouth of the hunter so that the hunter when in a kneeling position is free to maintain both hands on a shot gun while actuating the call and complemental VELCRO adhesive surfaces on the major and minor portions of the flexible strap to engage one another and secure the strap about the wrist of the hunter with only minor expansion of the strap about the wrist permitted by said elastic expandable strip between said major and minor portions of said wrist strap.

2. A fowl call holder as claimed in claim 1 wherein there are two fowl call encircling loops for holding both a feeding and mating call on the wrist of a hunter in a blind.

3. The method of combining a fowl call with a call holder attachable to a strap about the wrist of a hunter comprising the steps of forming a flexible wrist strap having a major and minor portion joinable by tear away connectors at their free ends with an expandable strip between the two portions of the wrist strap, placing an elastic call encircling strap loop on the wrist strap to resiliently and snugly engage about the fowl call and being oriented on the wrist strap at an angle to the major plane of the strap with the encircling strap loop positioned to thereby place the mouthpiece of the fowl call accessible to the mouth of the hunter when in a kneeling position so that the hunter is free to maintain both hands on a shot gun while actuating the call with only minor expansion of the strap about the wrist of the hunter occassioned by the expandable strip between the major and minor portions of the wrist strap.

* * * * *